Figure 1:
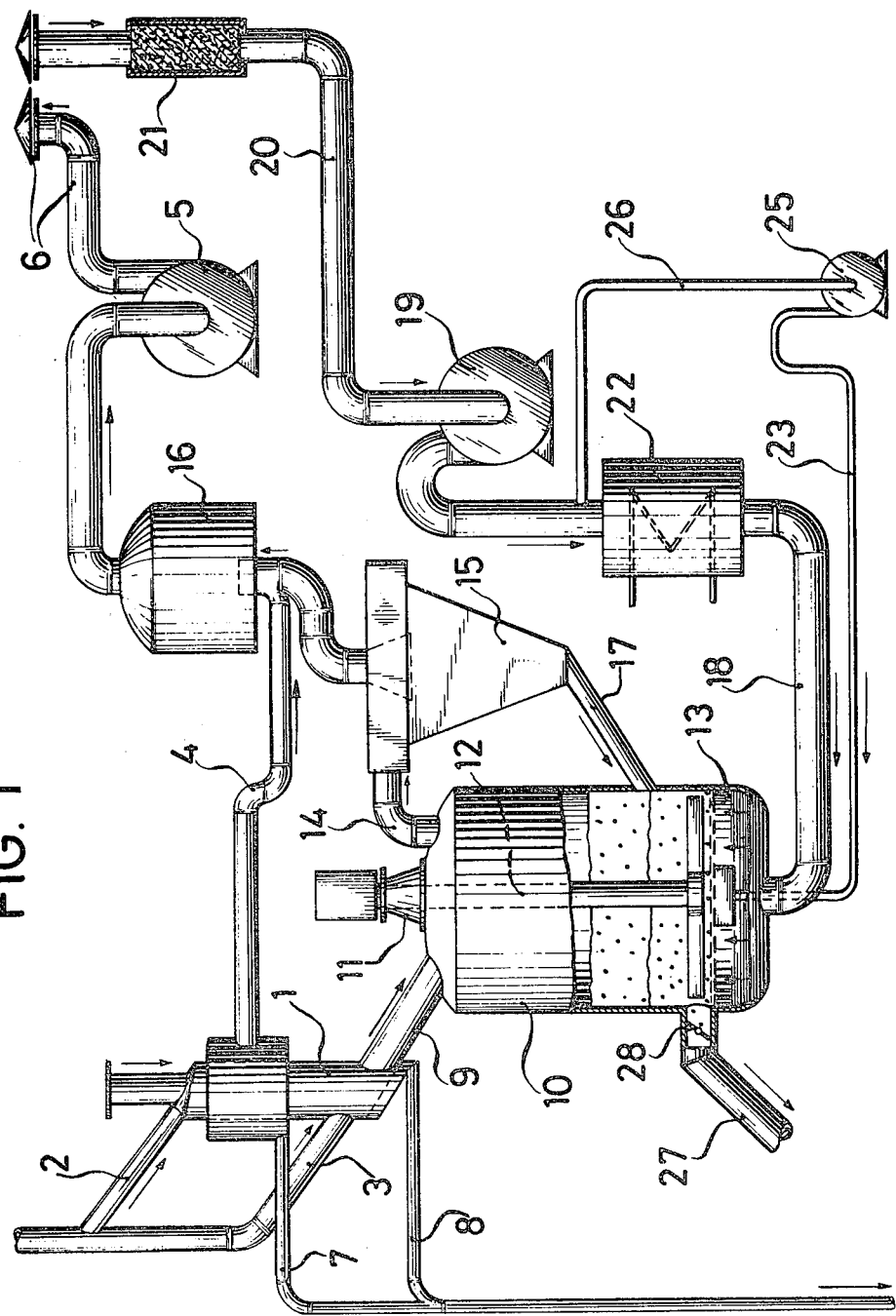

United States Patent [19]

Scholz et al.

[11] 4,319,409
[45] Mar. 16, 1982

[54] APPARATUS FOR DRYING CHLORINATED POLYMERS

[75] Inventors: Manfred Scholz, Hürth; Karl Kaiser, Brühl, both of Fed. Rep. of Germany

[73] Assignee: Hoechst Aktiengesellschaft, Frankfurt am Main, Fed. Rep. of Germany

[21] Appl. No.: 181,073

[22] Filed: Aug. 25, 1980

Related U.S. Application Data

[62] Division of Ser. No. 1,455, Jan. 8, 1979, Pat. No. 4,241,514.

[30] Foreign Application Priority Data

Jan. 11, 1978 [DE] Fed. Rep. of Germany ....... 2800952

[51] Int. Cl.³ ............................................. F26B 17/24
[52] U.S. Cl. ...................................... 34/58; 34/57 E; 34/60
[58] Field of Search ............ 34/58, 57 A, 57 R, 57 E, 34/60, 69; 432/58

[56] References Cited

U.S. PATENT DOCUMENTS

| 1,880,273 | 10/1932 | Pardee et al. | 34/58 |
| 3,118,658 | 1/1964 | Dennert | 34/57 R |
| 4,132,006 | 1/1979 | Scholz et al. | 34/10 |

*Primary Examiner*—John J. Camby
*Attorney, Agent, or Firm*—Connolly and Hutz

[57] ABSTRACT

An apparatus for drying moist chlorinated polymers, which are separated from an aqueous suspension, comprises a centrifugal nozzle structure which has a discharge outlet associated with it and a fluidized bed drier provided with a closable discharge outlet. The discharge outlet of the centrifugal nozzle structure opens into the upper portion of the fluidized bed drier.

3 Claims, 2 Drawing Figures

APPARATUS FOR DRYING CHLORINATED POLYMERS

This application is a division of application Ser. No. 001,455, filed Jan. 8, 1979, now U.S. Pat. No. 4,241,514.

This invention relates to a process for drying moist chlorinated polymers, especially chlorinated polyethylene, which are (is) separated from an aqueous suspension, and to an apparatus for carrying out this process.

Chlorinated polymers are produced by subjecting a suspension of the polymer in an aqueous medium to batchwise chlorination at temperatures higher than 100° C. After the chlorination has been terminated, hydrochloric acid is removed, the chlorinated polymer is washed several times with cold water and ultimately separated therefrom, e.g. by filtration. A process of this kind for making chlorinated polyolefins has been described in German Patent Specification "Offenlegungsschrift" No. 1 595 266.

The chlorinated polymers which are separated from the aqueous suspension generally contain 50 to 70 weight% of water. In industry, these moist polymers have heretofore been dried batchwise with the use of a fluidized bed drier provided with an agitator. Whenever the drier receives a fresh batch, it is necessary, by means of the agitator, to re-establish a bed of fluidized material therein. Needless to say, this is a method of drying chlorinated polymers which presents serious disadvantages in respect of the following points:

To free the chlorinated polymers from water which adheres thereto, it is necessary for them to be contacted with preheated drying gas. It is not possible to remove the water with the aid of machinery, such as a centrifuge, decanter or press, as the chlorinated polymers would then be liable to undergo partially irreversible agglomeration.

Also, heavily water-wetted polymeric material is liable to adversely affect the formation of a fluidized bed. Moist chlorinated polymers are indeed liable to initially form a cone of loosely aggregated material on the receiving plate of the fluidized bed drier, across which it is subsequently distributed by means of an agitator. Drying gas which is injected through the receiving plate into the drier preferentially flows initially through the uncovered (with polymer) portions of the receiving plate and later through channels and slits which are being formed in the polymers. During that phase, the polymers are naturally not effectively dried. Under the disglomerating action of the agitator, the polymers become however less moist and more fluidized and ultimately form a bed of fluidized material in the drier. Only from that moment on can the drier be operated under optimum conditions which enable the drying gas to be effectively utilized.

As a result of the heavy stress which the agitator is subjected to, especially at the onset of the drying period, and as a result of the fact that moist polymers are liable to coalesce, it is necessary for this structural component, which undergoes heavy wear, to be over-dimensioned.

It is therefore an object of the present invention to provide a process for drying moist chlorinated polymers and an apparatus for carrying out said process, which permits the feed and drying periods to be shortened, economies in drying energy to be realized, the agglomeration of moist polymers to be avoided and the driers' liability to fail to be reduced.

The present invention relates more particularly to a process for drying moist chlorinated polymers, which are separated from an aqueous suspension, which comprises: pre-drying the moist polymers in a centrifugation zone and completely drying the pre-dried polymers in a fluidization zone in contact with a continually maintained bed of fluidized material, the fluidization zone being arranged downstream of the centrifugation zone.

Further preferred features of the present invention provide:

(a) for the moist polymers to be passed through the centrifugation zone at a flow velocity of 10 to 150 m/second along helical lines, the flow velocity being produced by the injection of air into the upper portion of the centrifugation zone tangentially with respect thereto. The air which is so injected should preferably be maintained under a pressure of 2 to 16 bars and preheated to 20° to 200° C. With respect to the centrifugation zone, it is preferable for it to be fed at atmospheric pressure with the moist polymer and to be operated under a pressure of 1 millibar to 1 bar which makes it easier for centrifugated moisture to penetrate outwardly through the wall of the centrifugation zone;

(b) for the flow velocity of the moist polymers to be additionally increased by the injection of air into the lower portion of the centrifugation zone, tangentially with respect thereto;

(c) for the moist polymers to be passed through the centrifugation zone along predetermined helical lines;

(d) for the pre-dried polymers to be removed from the centrifugation zone by injecting air into the base portion of said zne, and delivered to the upper portion of the fluidization zone.

The air which is so injected should preferably be maintained under a pressure of 1.5 to 5 bars and a drying gas preheated to 50° to 150° C. should conveniently be used for producing the bed of fluidized material in the fluidization zone and for drying the pre-dried polymers therein. It is good practice to maintain the drying gas under a pressure of 1.01 to 1.3 bars. Air may more preferably be used as the drying gas which should conveniently be circulated and freed from moisture by condensation or absorption; and (e) for the pre-dried polymers which are delivered to the fluidization zone to be additionally agitated.

The apparatus for carrying out the present process comprises a centrifugal or centrifugation inducing nozzle structure having a discharge outlet associated with it and a fluidized bed drier provided with a closable discharge outlet, the discharge outlet of the centrifugal nozzle structure opening into the upper portion of the fluidized bed drier.

Further preferred features of the present apparatus provide:

(f) For the fluidized bed drier to be provided with a stirring apparatus of which the agitator terminates just above the receiving plate in the fluidized bed drier. Arranged so as to open into the base portion of the fluidized bed drier is a first gas supply line provided with a blower permitting compressed gas to be injected thereinto, the blower having a filter disposed in its inlet side and a heat exchanger disposed in its delivery side.

(g) For the base portion of the fluidized bed drier to have passed through it the said first gas supply line and a second gas supply line permitting gas to be admitted to the agitator and terminating below the receiving plate in a box-shaped component. By means of a second blower, compressed gas can be injected into said second gas supply line. Disposed in the upper portion of the fluidized bed drier is a conduit which runs to a cyclone and disposed in the base portion of the cyclone is another conduit which runs back to the fluidized bed drier, of which the discharge opening is closable by means of a flap. The cyclone communicates through a water-scrubbing stage with a blower and conduit running to a chimney.

(h) For the centrifugal nozzle structure to be provided with an eccentrically arranged inlet, for an upper tubular gas supply line to be passed through its wall at an acute angle and for a tubular outlet to be passed through its lower end, said tubular gas supply line and tubular material outlet opening with their respective obliquely cut end portions into the interior of the centrifugal nozzle structure. In order to favor the flow of moist polymer particles along helical lines, it is naturally possible to dispose a screw coil in the interior of the centrifugal nozzle structure.

(i) For the wall of the centrifugal nozzle structure to comprise permeable portions of the kind of a filtering shell and for the centrifugal nozzle structure itself to be formed with an annular space encircling the region of said filtering shell and being prefeably provided with an annular baffle plate. The annular shaft has a draining conduit passed through its base portion and is connected to a gas outlet. The latter communicates with the water-scrubbing stage which in turn is connected to a blower delivering issuing gas to the chimney.

(j) For the centrifugal nozzle structure to be formed with an oblique bottom portion which is permeable to liquid matter and in alignment with the tubular outlet and terminates downwardly in a chamber. The lowermost portion of the chamber, which itself is provided with an off-gas outlet, terminates in a draining conduit. At its wall opposite the draining shaft, the centrifugal nozzle structure has a gas supply line passed through it, coaxially with respect to said draining shaft.

In the present process, the moist chlorinated polymer particles are catapulted in the centrifugation zone into a helical trajectory, whereby a radial accelerating motion is imparted to the particles which enables them to be freed from moisture without the individual particles exerting pressure against each other.

In accordance with the present process, which provides for continuously pre-dried (in the centrifugation zone) chlorinated polymers to be intimately contacted in the fluidization zone with a bed or layer of fluidized material, it is possible to dry the polymers completely in quasicontinuous fashion. Delivering pre-dried material to the fluidization zone naturally means increasing the thickness of the bed of material originally fluidized therein. This original thickness or height of the bed of fluidized material is re-established at the end of each drying operation by the continuous removal of completely dry product.

Figure 2:
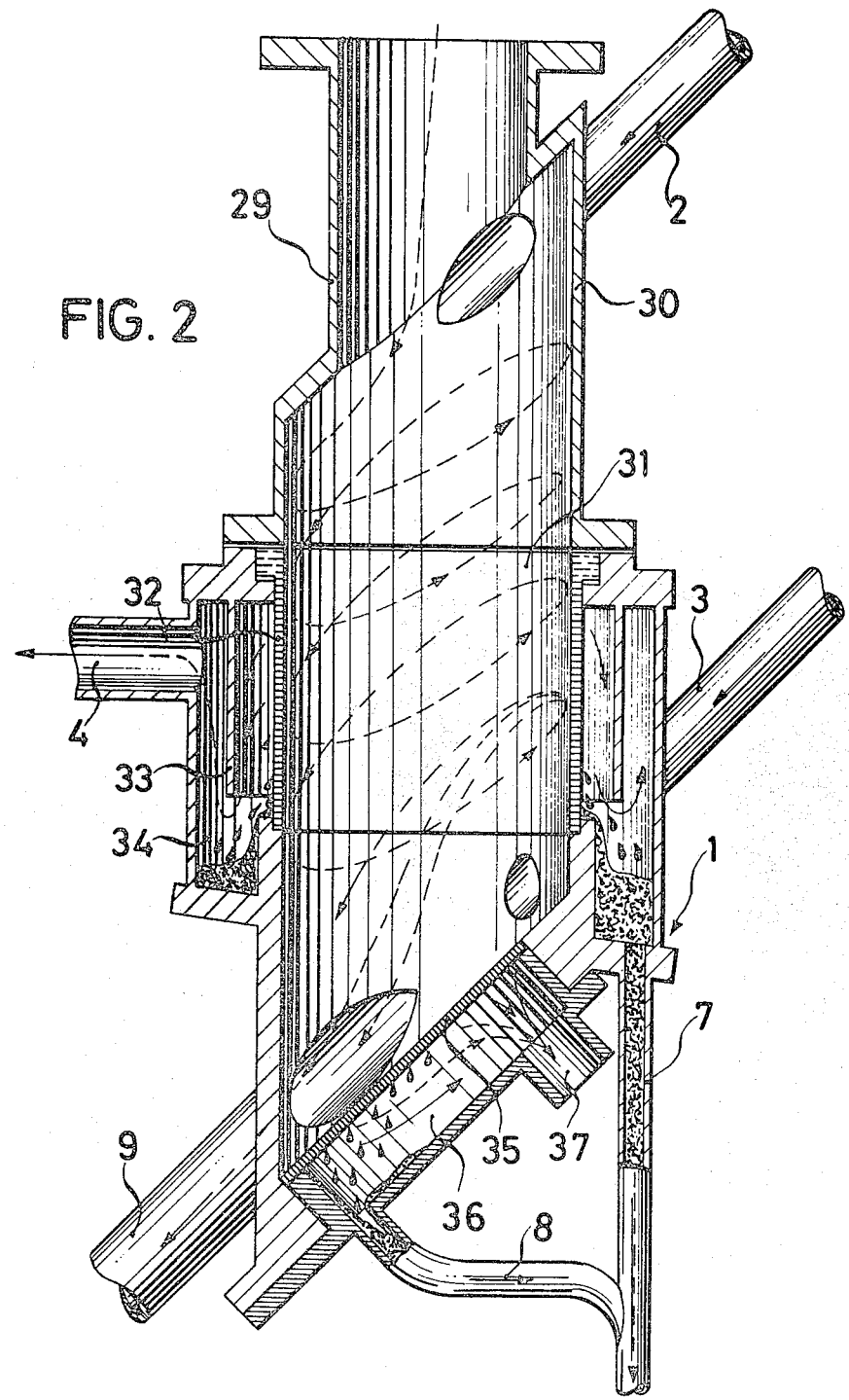

An exemplary apparatus for carrying out the present process is shown diagrammatically in the accompanying drawings of which FIG. 1 is a side elevational view, partially in section, of the entire apparatus and FIG. 2 is a side elevational view of the centrifugal nozzle structure.

With reference to the drawings:

A centrifugal nozzle structure 1 is formed with a first gas inlet 2 and a second gas inlet 3, a gas outlet 4 and a first discharge conduit 7 and a second discharge conduit 8. The gas outlet 4 opens into a water scrubbing means 16 which in turn is connected to a first blower 5 communicating with a chimney 6. The lower end of the centrifugal nozzle structure 1 terminates in a third discharge conduit 9 which is passed through the cover of the fluidized bed drier 10 and opens thereinto. Mounted on the cover of the fluidized bed drier 10 is a top mounting 11 provided with a stirring apparatus of which the agitator 12 which reaches deeply into the fluidized bed drier 10 terminates just above a receiving plate 13. Also passed through the cover of the fluidized bed drier 10 is a conduit 14 running to a cyclone 15 which is placed downstream of the water scrubbing means 16. Polymer particles which are separated in the cyclone 15 are recycled through a tubular structure 17 to the fluidized bed drier 10. Arranged so as to open into the base portion of the fluidized bed drier 10 is a third gas inlet 18 which receives preheated gas via a second blower 19 having an air filter 20 inserted in its suction side, and a heat exchanger 22. Passed through the base portion of the fluidized bed drier 10 is a fourth gas inlet 23 which permits scavening air to be admitted through the receiving plate 13 to the shaft of the agitator 12 and which terminates in an air chest 24. Compressed air is admitted to the fourth gas inlet 23 by means of a third blower 25 of which the suction side 26 opens into the delivery side of the second blower 19. Disposed in the lower portion of the fluidized bed drier 10 is a fourth discharge conduit 27 which is closable by means of a flap 28.

The centrifugal nozzle structure 1 is formed with an eccentrically disposed inlet 29 for the admission of moist polymers. The first gas inlet 2 is arranged so as to open at an acute angle into the centrifugal nozzle structure 1 through its wall 30, the end portion of the gas inlet which reaches into the interior 31 of the centrifugal nozzle structure 1 being obliquely cut. The wall 30 comprises portions of the kind of a filtering shell 32 permeable to liquid matter, the liquid penetrating through the filtering shell 32 being deflected in contact with a baffle plate 33 which is placed in a vertical position, and collected in a annular chamber 34, whose bottom portion has the first discharge conduit 7 passed through it. The upper portion of the annular chamber 34 communicates with the gas outlet 4. The centrifugal nozzle structure 1 is formed with an oblique bottom portion 35 permeable to liquid matter. Placed below it is a chamber 36 of which the lowermost portion terminates in the second discharge conduit 8. The chamber 36 is additionally provided with an off-gas outlet 37. Near its lower end, the centrifugal nozzle structure 1 has passed through it the third discharge conduit 9 of which the portion reaching into the interior 31 is obliquely cut and which is in alignment with the oblique bottom portion 35. Disposed at the side opposite the third discharge conduit 9 is the second gas inlet 3 which is passed through the wall 30 coaxially with respect to the third discharge conduit 9.

EXAMPLE

Chlorinated polyethylene which contained 51 weight% of water was pre-dried in the centrifugation zone. Compressed air was used to produce a flow velocity of 30 m/second. The chlorinated polyethylene which came from the centrifugation zone contained 22 weight% of water.

The fluidization zone was set to operation as follows:

Sieved dry and chlorinated polyethylene was introduced into the fluidization zone in a layer about 1 meter high. 500 normal m³ (S.T.P.) per hour of air was injected to produce a fluidized bed which was maintained. Next, 2000 to 4000 kg/h batches of pre-dried chlorinated polyethylene were introduced with the aid of air (10 normal m³/h) under a pressure of 4 bars and intimately contacted with the chlorinated polyethylene forming the fluidized bed, which was additionally agitated.

Compressed air maintained under a pressure of 1.8 bars and heated to 100° to 120° C. in a heat exchanger with the use of a steam as the heating medium was employed to maintain the fluidized bed.

The issuing air which contained steam was passed through the water-scrubbing zone and allowed to escape into the atmosphere.

Completely dried chlorinated polyethylene with a residual moisture content of about 0.2 weight% which could not be found to have coalesced was obtained in the fluidization zone. It was continuously removed in a quantity corresponding to the quantity of pre-dried material initially admitted to the fluidization zone.

A certain quantity of completely dried chlorinated polyethylene necessary to maintain the fluidized bed was retained in the fluidization zone, and the fluidized bed was contacted with a fresh quantity of pre-dried chlorinated polyethylene.

We claim:

1. An apparatus for drying moist chlorinated polymers separated from an aqueous suspension, the apparatus comprising a centrifugal nozzle structure and a fluidized bed drier; said centrifugal nozzle structure having a wall being formed with an eccentrically disposed inlet for the admission of moist polymers and with a first gas inlet arranged so as to open at an acute angle into the structure through said wall and being cut obliquely in the structure; said wall comprising portions of the kind of a filtering shell permeable to liquid matter, and said filtering shell being concentrically surrounded by an annular chamber having a first discharge conduit in its bottom portion passed through it and a gas outlet communicating with its upper portion; said centrifugal nozzle structure being further formed with an oblique bottom portion permeable to liquid matter, and a chamber being placed below said bottom portion, said chamber being connected to a second discharge conduit and having an off-gas outlet; said centrifugal nozzle structure being at least formed with a third discharge conduit passed through it in alignment with the oblique bottom portion and being cut obliquely in the structure; said fluidized bed drier comprising a cylindrical shell, a cover, a base portion and a receiving plate; said third discharge conduit being passed through said cover and opening into the fluidized bed drier; said cover being penetrated by a shaft terminating in an agitator just above said receiving plate; a third gas inlet receiving preheated gas being arranged so as to open into said base portion; a fourth gas inlet being passed through said base portion terminating in an air chest; and a fourth dischage conduit penetrating said cylindrical shell and being closable by means of a flap.

2. The apparatus as claimed in claim 1, wherein the centrifugal nozzle structure is formed with a baffle plate which is arranged in the annular chamber concentrically with respect to the filtering shell.

3. The apparatus as claimed in claim 1, wherein the wall of the centrifugal nozzle structure is penetrated by a second gas inlet which is arranged opposite the third discharge conduit and coaxially with respect to said third discharge conduit.

* * * * *